US007167790B2

(12) United States Patent
Kikutani

(10) Patent No.: US 7,167,790 B2
(45) Date of Patent: Jan. 23, 2007

(54) ENGINE CONTROL SYSTEM

(75) Inventor: Takashi Kikutani, Ama-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/235,073

(22) Filed: Sep. 27, 2005

(65) Prior Publication Data

US 2006/0074542 A1 Apr. 6, 2006

(30) Foreign Application Priority Data

Oct. 6, 2004 (JP) ............................. 2004-293791
Jul. 26, 2005 (JP) ............................. 2005-216287

(51) Int. Cl.
*B60T 7/12* (2006.01)
*F02M 25/07* (2006.01)

(52) U.S. Cl. .................................. 701/103; 123/568.11

(58) Field of Classification Search ................ 701/101, 701/103, 104, 105, 114, 115; 123/568.11, 123/568.21, 478, 480
See application file for complete search history.

(56) References Cited

U.S. PATENT DOCUMENTS 5,168,952 A * 12/1992 Oono et al. ................. 180/197
6,612,292 B1 * 9/2003 Shirakawa .................. 123/501
6,845,750 B1 * 1/2005 Matischuk et al. ..... 123/339.19
6,898,927 B1 * 5/2005 Morinaga et al. ............. 60/284
2002/0124828 A1 * 9/2002 Shirakawa .................. 123/299
2002/0189254 A1 * 12/2002 Shirakawa ................... 60/602

FOREIGN PATENT DOCUMENTS

EP 0 793 084 A2 9/1997
JP 9-226482 9/1997

* cited by examiner

*Primary Examiner*—John T. Kwon
(74) *Attorney, Agent, or Firm*—Nixon & Vanderhye P.C.

(57) ABSTRACT

A control system for controlling a control target apparatus provided to an engine includes a main ECU and a sub-ECU. The main ECU calculates at least one operational command value according to an operational state of the engine. The at least one operational command value is used to operate the control target apparatus. The sub-ECU is independent of the main ECU, and controls the control target apparatus non-autonomously and autonomously. In non-autonomous control of the control target apparatus, the sub-ECU corrects the at least one operational command value, which is calculated by the main ECU. The sub-ECU non-autonomously controls the control target apparatus by use of the corrected at least one operational command value corrected by the sub-ECU. In autonomous control of the control target apparatus, the sub-ECU autonomously controls the control target apparatus independently of the main ECU, when a predetermined condition is satisfied.

7 Claims, 5 Drawing Sheets

ENGINE CONTROL SYSTEM

CROSS REFERENCE TO RELATED APPLICATION

This application is based on and incorporates herein by reference Japanese Patent Applications No. 2004-293791 filed on Oct. 6, 2004 and No. 2005-216287 filed on Jul. 26, 2005.

BACKGROUND OF THE INVENTION

1. Field of the Invention

The present invention relates to an engine control system.

2. Description of Related Art

An ECU (an ECU arrangement) for controlling an engine is used to control multiple control target apparatuses relating to an engine control, and to control a part of functional units that are installed in a vehicle. The control target apparatuses include a fuel injection apparatus, a supercharger, an EGR apparatus, etc. The functional units include a safety device, an amenity-improvement device, etc.

The ECU controls each of the control target apparatuses according to an operational state of the engine and the like.

Recently, control of the control target apparatuses is liable to become more complex to achieve an advanced control.

Specifically, the fuel injection apparatus for a diesel engine is used as one of the control target apparatuses. Recent tightening of regulations for exhaust gases enhances the needs of pilot injections and multiple injections. A degree of accuracy of an injection quantity and an injection timing of each injection also needs to be improved. Thus, multiple correction processes and data for correction (e.g., a map) for each injection are needed. Therefore, an optimization process of each injection becomes complex. This results in an increase in a computation load of the ECU.

This is not limited to the fuel injection apparatus. The control programs for other apparatuses, such as for the supercharger and the exhaust gas recirculation (EGR) apparatus, are liable to become complex.

The first disadvantage will be described. There may be a case where one of the control target apparatuses, which are related to the engine control, is changed to a different-version control target apparatus. For example, the control target apparatus, which the ECU has controlled up to this time, is replaced with a newly developed control target apparatus or a control target apparatus of other company. Specifically, there may be an assumed case where the fuel injection apparatus, which is one of the control target apparatuses, is replaced with a newly developed advanced apparatus to improve an engine performance (e.g., exhaust emission control performance).

Even in the case where only one control target apparatus is replaced like wise, the whole ECU needs to be replaced, because a conventional ECU is constituted as a single unit.

The ECU as the single unit means that a control unit includes a single computer.

As described above, the ECU controls the multiple control target apparatuses for the engine control and a part of the functional units, which are installed in the vehicle. Thus, the ECU needs an enormous amount of control programs.

Therefore, when only one control target apparatus needs to be replaced, the whole ECU, which needs the enormous amount of control programs, needs to be replaced. Thus, this necessitates enormous manpower for development, and this results in an enormous cost. This makes it difficult to improve the engine function through replacement of one control target apparatus with other control target apparatus.

The second disadvantage will be described. As a countermeasure for the above-described inconvenience, the ECU may be divided into a main ECU and sub-ECUs. The main ECU performs a basic computation. Each sub-ECU controls a corresponding control target apparatus based on an operational command value, which is calculated by the main ECU.

However, the following disadvantages are caused, when the sub-ECU specifically controls a specific control target apparatus based on the operational command value of the main ECU.

For example, when a learning operation of the control target apparatus, which the sub-ECU controls, is performed, the control target apparatus needs to be operated at a special operational state, which is suitable for the learning operation.

Specifically, when the learning operation is performed for the fuel injection apparatus, a special engine operational state, which is suitable for the learning operation, may need to be set. The special engine operational states include, for example, a special idling and a check operation with a check command.

In this case, the main ECU needs to calculate the operational command value, which sets up the special engine operation. In order to achieve this, the main ECU more closely relates with the fuel injection apparatus. This may eliminate an advantage of installing the divided sub-ECU, or the sub-ECU that directly controls the control target apparatus.

The third disadvantage will be described. When the learning operation is performed, the main ECU sets up the special engine operational state, which is suitable for the learning operation. Thus, an operation of the control target apparatus during an “interval between a start and an end of the learning operation” depends on the main ECU.

An opportunity to perform the learning operation while driving the vehicle is usually not often and also limited to a short time. Thus, the learning operation is often not finished.

Therefore, when the operational state becomes suitable for the learning operation, the learning operation needs to be performed as soon as possible.

However, in a case where the main ECU performs the learning operation, a possibility of finishing the learning operation becomes lower, because a control logic interrupt latency at the main ECU occurs.

As described in the above learning operation, the sub-ECU depends on a control command of the main ECU, even when the ECU is divided into the main ECU and the sub-ECU. This results that the two ECUs control the control target apparatus. Therefore, the sub-ECU cannot freely control the control target apparatus.

In other words, a control range for the sub-ECU to control the control target apparatus is always limited by an operation of the main ECU. Therefore, the advantage, which is caused by dividing the ECU into the main ECU and the sub-ECUs, is not substantially maximized.

SUMMARY OF THE INVENTION

The present invention addresses the above disadvantages. Thus, it is an objective of the present invention to provide an engine control system, which minimizes the manpower for development, in a case where one of control target apparatuses that are related to an engine control is replaced with a different-version control target apparatus.

To achieve the objective of the present invention, there is provided a control system for controlling a control target apparatus provided to an engine. The control system includes a main ECU and a sub-ECU. The main ECU calculates at least one operational command value according to an operational state of the engine, and the at least one operational command value is used to operate the control target apparatus. The sub-ECU is independent of the main ECU, and controls the control target apparatus non-autonomously and autonomously. In non-autonomous control of the control target apparatus, the sub-ECU corrects the at least one operational command value, which is calculated by the main ECU, based on at least one of the followings: the operational state of the engine, and a correction value, which is stored in a storage of the sub-ECU to correct the at least one operational command value. The sub-ECU non-autonomously controls the control target apparatus by use of the corrected at least one operational command value corrected by the sub-ECU. In autonomous control of the control target apparatus, the sub-ECU autonomously controls the control target apparatus independently of the main ECU, when at least one of the following three conditions is satisfied: A predetermined external operational command, which commands the sub-ECU to autonomously control the control target apparatus independently of the main ECU, is given to the sub-ECU. An operational delegation command, which allows the sub-ECU to autonomously control the control target apparatus independently of the main ECU, is given to the sub-ECU by the main ECU. The engine is operated under a predetermined operational state.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Embodiment

The embodiment of the present invention will be described with reference to the accompanying drawings (FIGS. 1–5).

A basic constituent of the present embodiment will be described. An engine control system includes a plurality of control target apparatuses and an ECU (an ECU arrangement). The plurality of control target apparatuses is related to an engine control. The ECU controls an operation of the plurality of control target apparatuses according to an operational state of the engine 11.

Figure 1:
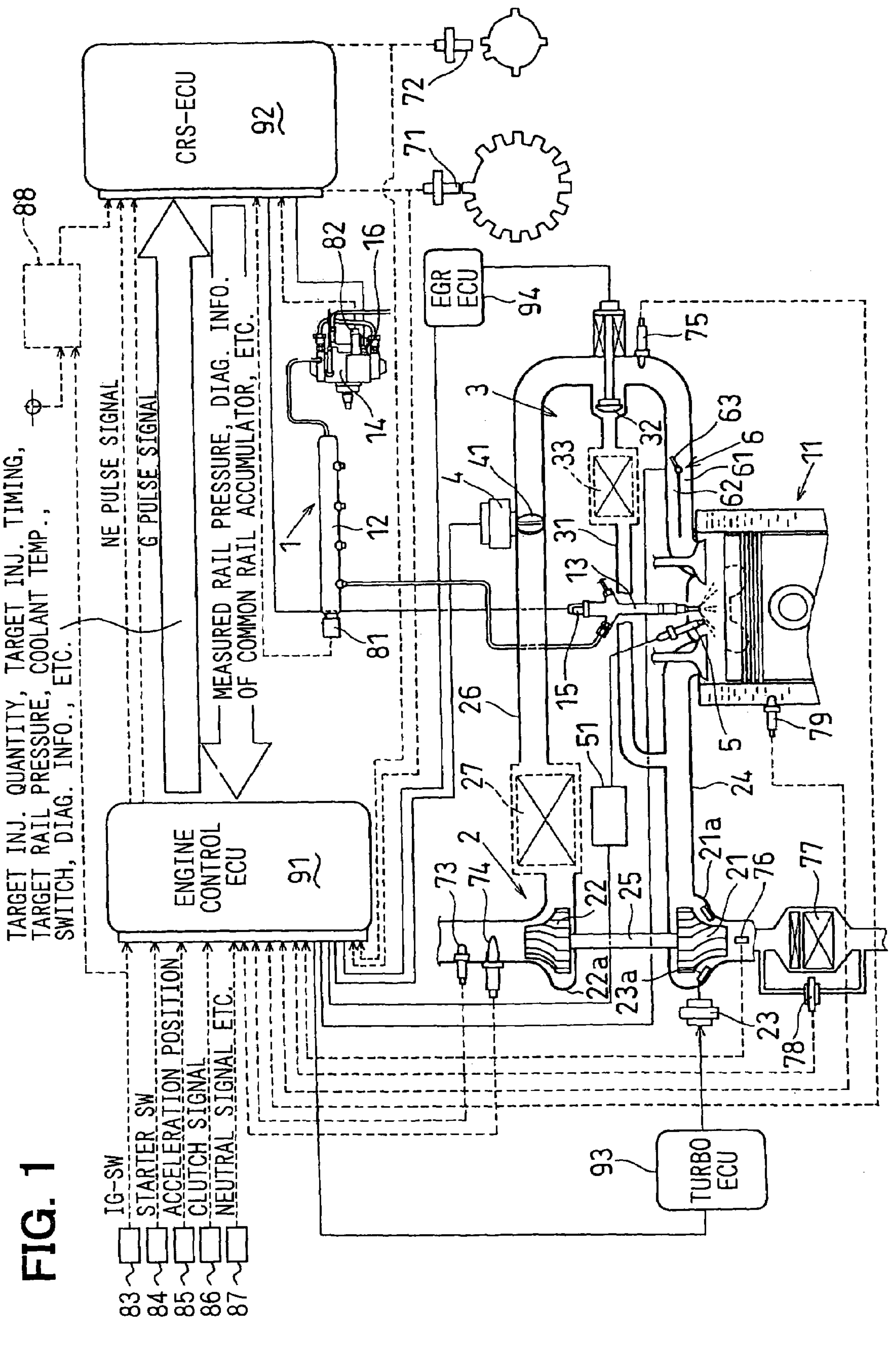
FIG. 1 is a diagram showing an engine control system.

FIG. 1 shows control target apparatuses, such as a common rail fuel injection apparatus 1, a supercharger 2, an EGR apparatus 3, an intake throttle 4, a glow plug 5 and a swirl control apparatus 6.

The common rail fuel injection apparatus 1 will be described. The common rail fuel injection apparatus 1 is an injection system for injecting a fuel to the engine (e.g., a diesel engine) 11. The common rail fuel injection apparatus 1 includes a common rail accumulator 12, injectors 13 and a supply pump 14.

The common rail accumulator 12 is an accumulator for accumulating a high-pressure fuel, which is supplied to the injectors 13. The common rail accumulator 12 is connected with an outlet of the supply pump 14 through a pump pipe (a high-pressure fuel pipe) to continuously accumulate a rail pressure, which corresponds to a fuel injection pressure. The supply pump 14 pumps the high-pressure fuel. A plurality of injector pipes, each of which supplies a high-pressure fuel to a corresponding one of the injectors 13, is connected to the common rail accumulator 12.

Each injector 13, which is mounted on a corresponding one of cylinders of the engine 11, injects fuel to the cylinder. The injector 13 is connected to a downstream end of the corresponding injector pipe, which branches off from the common rail accumulator 12. The injector 13 has a fuel injection nozzle and a solenoid valve 15. The fuel injection nozzle injects the high-pressure fuel, which is accumulated in the common rail accumulator 12, to the cylinder. The solenoid valve 15 performs a lifting control of a needle, which is received inside the fuel injection nozzle. When the solenoid valve 15 is energized, the injector 13 injects the fuel.

The supply pump 14 is a fuel pump for pumping the high-pressure fuel to the common rail accumulator 12. The supply pump 14 includes a feed pump and a high-pressure pump. The feed pump draws the fuel of a fuel tank into the supply pump 14, and the high-pressure pump compresses the fuel to a high pressure and pumps the fuel to the common rail accumulator 12. The feed pump and the high-pressure pump are driven by a common camshaft, which is rotated by a power of the engine 11.

The supply pump 14 includes a suction control valve (SCV) 16 that adjusts an amount of the fuel, which is drawn by the high-pressure pump. The rail pressure, which is accumulated in the common rail accumulator 12, is adjusted through control of the current supplied to the SCV 16.

The supercharger 2 will be described. The supercharger 2 of the present embodiment is a variable geometry turbo (VGT), and includes an exhaust turbine 21, an intake compressor 22 and a turbo actuator 23 for changing a boost pressure.

The exhaust turbine 21 is an impeller, which is surrounded by a turbine housing 21*a* having a spiral form. The exhaust turbine 21 is rotated by an exhaust gas flow, which passes through an exhaust pipe 24.

The intake compressor 22 is an impeller, which is connected with the exhaust turbine 21 through a shaft 25, and rotates integrally with the exhaust turbine 21. The intake compressor 22 is surrounded by a turbine housing 22*a* having a spiral form. The intake compressor 22 compresses air of an intake pipe 26 and supplies the compressed air to the engine 11 by use of a rotational drive force of the exhaust turbine 21. It is desirable that an intercooler 27 is positioned inside the intake pipe 26, which is located on a downstream side of the intake compressor 22, as shown by dashed lines in FIG. 1. This may desirably cool the supercharged air, which is heated though the compression of the air by the intake compressor 22, and thereafter the cooled supercharged air may be led into the engine 11.

The turbo actuator 23 controls the boost pressure (intake pressure, which is compressed by the intake compressor 22)

through adjustment of an angle of a flap 23*a,* which blows the exhaust gas to the exhaust turbine 21.

The EGR apparatus 3 will be described. The EGR apparatus 3 includes an EGR passage 31 and an EGR valve 32.

The EGR passage 31 is a return passage, which takes a part of the exhaust gas from the exhaust pipe 24 on an upstream side of the turbo actuator 23 and returns it to an intake side of the engine 11. An upstream end of the EGR passage 31 branches off from the exhaust pipe 24, and a downstream end of the EGR passage 31 is connected to the intake pipe 26, which is located on a downstream side of the intake compressor 22. It is desirable that an EGR cooler 33 is positioned inside the EGR passage 31 as shown by the dashed lines in FIG. 1. This may desirably cool the hot exhaust gas and then returns the cooled exhaust gas to the intake side of the engine 11.

The EGR valve 32 adjusts an EGR ratio of the exhaust gas to newly supplied fresh air through adjustment of the amount of the exhaust gas, which is returned to the intake side of the engine 11 by use of the EGR passage 31.

The intake throttle 4 will be described. The intake throttle 4 adjusts an amount of air (an amount of combustible air), which is drawn to the engine 11, through adjustment of a degree of opening of a butterfly valve 41, which is located inside the intake pipe 26.

The glow plug 5 will be described. The glow plug 5 is a starting aid, which generates heat upon energization thereof, and heats the fuel that is injected inside the cylinder. The energization of the glow plug 5 is controlled by a glow relay 51.

The swirl control apparatus 6 will be described. The swirl control apparatus 6 divides a combustion-chamber side of an intake passage of the intake pipe 26 into a main passage 61 and a sub passage 62. The swirl control apparatus 6 controls a swirl, which is generated inside the combustion chamber, through adjustment of a degree of opening of the sub passage 62 by use of a swirl valve 63.

The ECU will be described. The ECU controls an operation of each control target apparatus according to the operational state of the engine 11. Signals of sensors are inputted into the ECU to sense the operational state of engine 11.

The sensors, which are connected to the ECU, include a revolution sensor 71 (NE sensor), an angle sensor 72 (G sensor), an intake air temperature sensor 73, a mass air flow sensor 74, an air pressure sensor 75, an exhaust gas temperature sensor 76, a differential pressure sensor 78, a coolant temperature sensor 79, a rail pressure sensor 81, a fuel temperature sensor 82, an ignition switch 83, a starter switch 84, an accelerator position sensor 85, a clutch switch 86, a neutral switch 87 and other sensors. The revolution sensor 71 senses a number of revolutions of the engine per unit time. The angle sensor 72 is mounted on an engine camshaft for determining an injection timing. The intake air temperature sensor 73 senses a temperature of the new air, which is supplied to the intake compressor 22. The mass air flow sensor 74 senses the amount (flow rate) of air, which is supplied to the intake compressor 22. The air pressure sensor 75 senses the boost pressure on a downstream side of the intake compressor 22. The exhaust gas temperature sensor 76 senses a temperature of the exhaust gas on a downstream side of the exhaust turbine 21. The differential pressure sensor 78 senses a pressure difference between a pressure at an upstream side of a catalyst (DPF) 77 and a pressure at a downstream side of the catalyst 77. The coolant temperature sensor 79 senses a coolant temperature of the engine 11. The rail pressure sensor 81 senses the rail pressure, which is accumulated in the common rail accumulator 12. The fuel temperature sensor 82 senses a temperature of fuel, which is compressed by the supply pump 14 (a temperature of fuel, which is supplied to the injector 13). The ignition switch 83 is operated by an occupant. The accelerator position sensor 85 senses a degree of opening of the accelerator. The clutch switch 86 senses an operational state of a clutch. The neutral switch 87 senses a neutral state.

A main relay 88 in FIG. 1 inputs a power to an injection control ECU 92, which will be described later.

A conventional ECU will be described to compare the present embodiment with a conventional art.

Conventionally, a single unit of the ECU (a control apparatus having a single computer) controls the common rail fuel injection apparatus 1.

The conventional ECU includes a known microcomputer, which includes a single CPU, a storage device, an input circuit, an output circuit and a power circuit.

The single CPU performs a control process and a computation process. The storage device (e.g., ROM, a stand-by RAM or a memory such as EEPROM, RAM and the like), stores various programs and data. The conventional ECU controls the multiple control target apparatuses based on inputted sensor signals, which are inputted to the conventional ECU. The control target apparatuses include the common rail fuel injection apparatus 1, the supercharger 2, the EGR apparatus 3, the intake throttle 4, the glow plug 5 and the swirl control apparatus 6. The inputted sensor signals indicate the operational states of the engine 11 and the like, such as an operational state by the occupant, the operational state of the engine 11 and a running state of the vehicle.

Functions of the conventional ECU will be briefly described as the following (1) to (7).

(1) a function of an input processing for various sensor inputs and various switch inputs This function is for sensing a driving intention of the occupant, senses a surrounding environment state, and calculates an engine operational state.

(2) a function of calculating engine parameters

This function calculates a target idle speed during an idle control, a target injection quantity, a target injection timing, a target rail pressure, a target boost pressure, a target EGR ratio, a target throttle angle, a presence or absence of the energization of the glow plug, a swirl angle and the like.

(3) a function of operating engine accessories and actuators

This function operates the injector 13 (the solenoid valve 15), the supply pump 14 (SCV 16), the turbo actuator 23, the EGR valve 32, the intake throttle 4, the glow relay 51, the swirl valve 63 and the like.

(4) a function of various learning controls and a memory processing of learning values (5) a function of a communication processing with other control units (e.g., an air conditioner control apparatus, a hydraulic control apparatus of an automatic transmission and the like)

(6) a function of a diagnosis fail-safe processing (7) a function of a post treatment processing control during an engine stop The ECU of the present embodiment will be described. By contrast with the conventional ECU, the ECU of the present embodiment includes the main ECU (an engine control ECU in FIG. 1) 91, the injection control ECU (a CRS-ECU in FIG. 1, the sub-ECU in FIG. 3) 92, a boost control ECU (a turbo ECU in FIG. 1) 93 and an EGR control ECU (EGR ECU in FIG. 1) 94.

The common rail fuel injection apparatus 1 is controlled through the main ECU 91 and the injection control ECU 92. The supercharger 2 is controlled through the main ECU 91 and the boost control ECU 93. The EGR apparatus 3 is controlled through the main ECU 91 and the EGR control ECU 94.

The intake throttle 4, the glow plug 5 and the swirl control apparatus 6 are directly controlled through the main ECU 91.

The main ECU 91 is an independent computer, which is independent of the other ECUs (e.g., the injection control ECU 92, the boost control ECU 93 and the EGR control ECU 94). The main ECU 91 includes a CPU, a storage device, an input circuit, an output circuit and a power circuit. The CPU performs a control process and a calculating process. The storage device stores various programs and data. The power circuit may be commonly used with the other ECUs. The main ECU 91 at least includes the computer, which performs calculation independently of the other ECUs.

The main ECU 91 calculates operational command values of the common rail fuel injection apparatus 1, the supercharger 2, and the EGR apparatus 3 according to the operational state of the engine 11. Then, the main ECU 91 gives the calculated operational command values to the injection control ECU 92, the boost control ECU 93 and the EGR control ECU 94. Also, the main ECU 91 directly controls the intake throttle 4, the glow plug 5 and the swirl control apparatus 6 according to the operational state of the engine 11. The operational command values of the common rail fuel injection apparatus 1 include the target injection quantity, the target injection timing and the target rail pressure. The operational command values of the supercharger 2 include the target boost pressure. The operational command values of the EGR apparatus 3 include the target EGR ratio.

Control of the common rail fuel injection apparatus 1 will be described. The common rail fuel injection apparatus 1 is controlled by the main ECU 91 and the injection control ECU 92 as described above.

A function of the main ECU 91 for controlling the common rail fuel injection apparatus 1 will be described. The main ECU 91 calculates the operational command values, which are fundamental values for an injection control of the common rail fuel injection apparatus 1. The operational command values of the common rail fuel injection apparatus 1 include the target injection quantity, the target injection timing and the target rail pressure. Then, the main ECU 91 outputs the operational command values to the injection control ECU 92. Also, in addition to the operational command values, the main ECU 91 outputs the operational state information of the engine 11, such as coolant temperature information, switch information and diagnosis information, to the injection control ECU 92.

A function of the injection control ECU 92 will be described. The injection control ECU 92 directly controls all actuators, which are mounted on the common rail fuel injection apparatus 1. The injection control ECU 92 includes an independent computer, which is independent of the other ECUs (the main ECU 91, the boost control ECU 93 and the EGR control ECU 94). Also, the injection control ECU 92 includes the CPU, the storage device, the input circuit, the output circuit and the power circuit. The CPU performs the control process and the calculating process. The storage device stores various programs and data. The power circuit may be commonly used with the other ECUs. The injection control ECU 92 at least includes the computer, which performs calculation independently of the other ECUs.

The injection control ECU 92 performs a correction processing of the operational command values (the target injection quantity, the target injection timing and the target rail pressure), which are inputted by the main ECU 91, as described later.

Sensor signals of the common rail fuel injection apparatus 1 are inputted to the injection control ECU 92. The injection control ECU 92 outputs operational information of the common rail fuel injection apparatus 1, such as a measured rail pressure and the diagnosis information of the common rail fuel injection apparatus 1, to the main ECU 91.

As described later, the injection control ECU 92 autonomously controls the common rail fuel injection apparatus 1 independently of the main ECU 91 in a special mode. Sensor signals, which include a switch signal, for the autonomous control, are also directly inputted to the injection control ECU 92.

The injection control ECU 92 includes the following functions, which are separated from the above-described functions of the conventional ECU.

The functions of the injection control ECU 92 will be briefly described as the following (1) to (7).

(1) a control function for a general operational state

This function performs the correction processing of the operational command values (the target injection quantity, the target injection timing and the target rail pressure), which are inputted by the main ECU 91.

Specifically, the control function consists of two correction functions. The first correction function corrects the operational command values (the target injection quantity, the target injection timing and the target rail pressure), which are inputted by the main ECU 91, based on the operation information (the operational state of the engine 11), which is either given by the main ECU 91 or directly inputted to the injection control ECU 92. The second correction function corrects the operational command values, which are inputted by the main ECU 91, based on correction values (a learning value, an initial correction value for correcting differences between devices and the like), which are stored in the storage device.

(2) a diagnosis fail-safe control function

This function performs the diagnosis fail-safe processing for the common rail fuel injection apparatus 1, such as for the injector 13 and the supply pump 14.

With this diagnosis fail-safe control function, the injection control ECU 92 autonomously controls functional components of the common rail fuel injection apparatus 1, such as the injector 13 and the supply pump 14, based on various sensor signals, which are inputted to the injection control ECU 92, in a case where the injection control ECU 92 senses a malfunction (e.g., a failure) of the main ECU 91. The diagnosis fail-safe control function will be described later.

(3) a control function for a special mode

This function performs various learning controls for the common rail fuel injection apparatus 1, such as for the injector 13 and the supply pump 14.

With the control function for the special mode, the injection control ECU 92 autonomously controls the common rail fuel injection apparatus 1, and the learning operation of an actuator, which is mounted on the common rail fuel injection apparatus 1, is performed. The control function for the special mode will be described later.

(4) a memorizing function for memorizing the learning value

This is a function for memorizing the learning values, the initial correction values, and the like. The leaning values are calculated during the learning operation, The initial correction values are inputted at the time of factory shipping, and are used for correcting differences between devices.

(5) a function of operating each actuator of the common rail fuel injection apparatus 1

This function operates the injector 13 (the solenoid valve 15) and the supply pump 14 (the SCV 16) based on the injection start timing of the injector 13, the injection quantity and a fuel pumping amount of the high-pressure pump. The injection start timing of the injector 13 relates to an energization start timing of the solenoid valve 15 of the injector 13. The injection quantity relates to the injection period of the injector 13 or an energization period of the solenoid valve 15 of the injector 13. The fuel pumping amount of the high-pressure pump relates to a current supplied to the SCV 16.

(6) a function of the communication processing with other control units (e.g., the main ECU 91)

(7) a function for giving the operational command value to the supercharger 2 and the EGR apparatus 3

With this function, the injection control ECU 92 calculates the operational command values of the supercharger 2 and the EGR apparatus 3 in place of the main ECU 91, and the injection control ECU 92 gives the calculated operational command value to the boost control ECU 93 and the EGR control ECU 94, while the injection control ECU 92 autonomously controls the common rail fuel injection apparatus 1.

The diagnosis fail-safe control function will be described. The main ECU 91 has a self diagnosis means to check whether the main ECU 91 is operated properly. If the self diagnosis means determines a failure of itself (the main ECU 91), an indicating means (e.g., a lamp) is used to display an "occurrence of the failure" toward the occupant.

The injection control ECU 92 is designed to receive diagnosis results (e.g., a flag indicating a normal state) of the self diagnosis means that is installed in the main ECU 91. If the main ECU 91 is determined to have the failure, the injection control ECU 92 neglects the operational command values (the target injection quantity, the target injection timing and the target rail pressure), which are inputted by the main ECU 91. Instead, the injection control ECU 92 autonomously controls the functional components of the common rail fuel injection apparatus 1, such as the injector 13 and the supply pump 14, based on the various sensor signals (present operational states), which are inputted to the injection control ECU 92.

Figure 2:
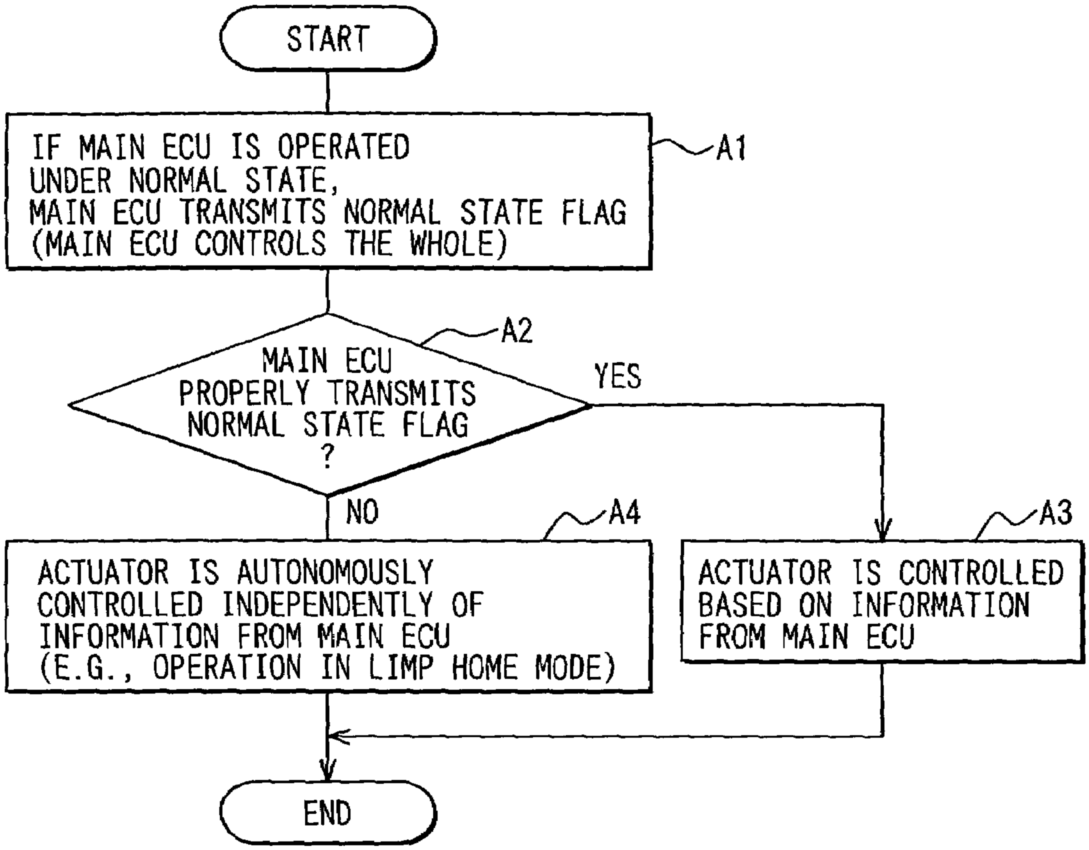
FIG. 2 is a flow chart for controlling a diagnosis fail-safe control function.
Figure 3:
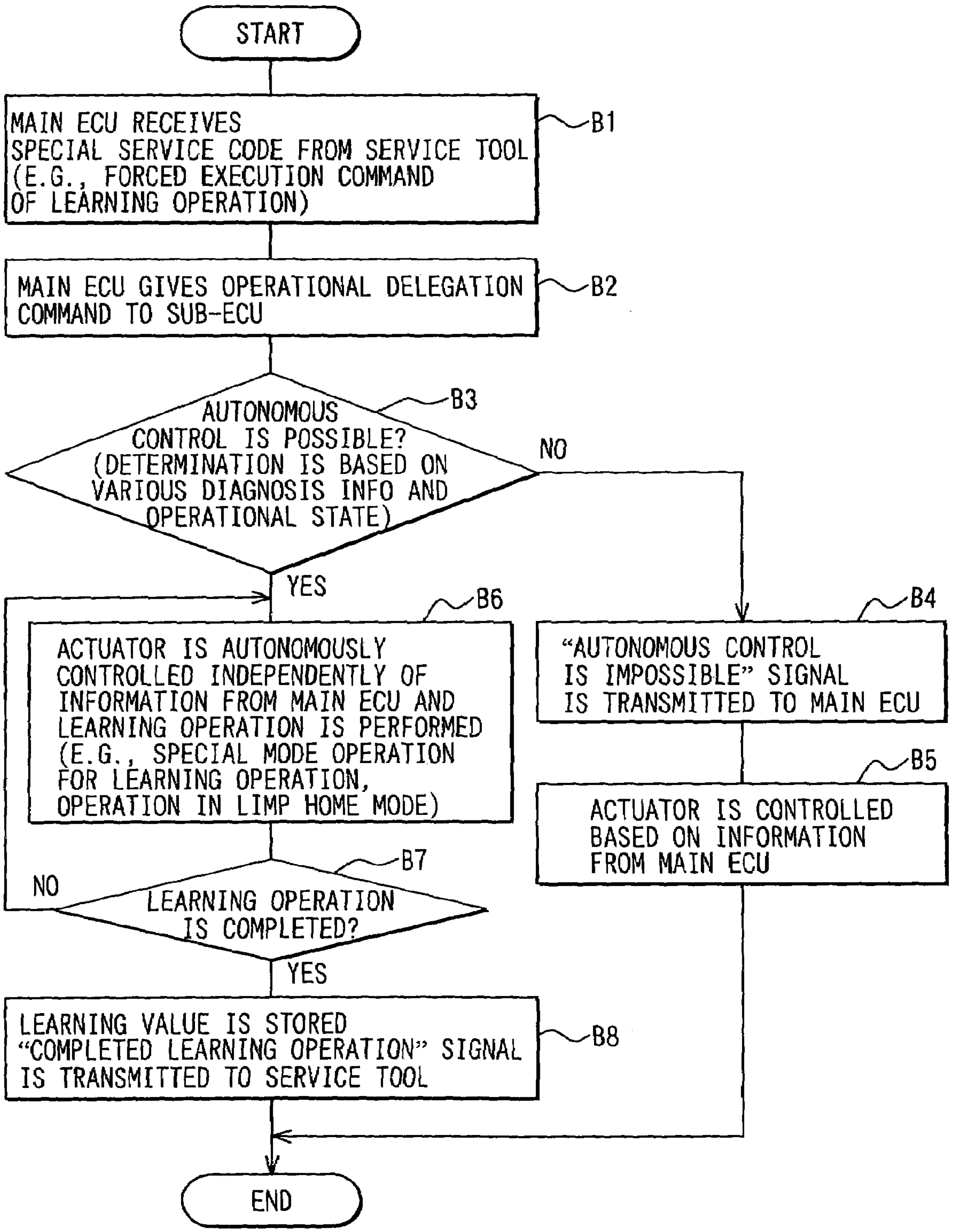
FIG. 3 is a flow chart for performing a learning control by giving a signal to a main ECU from a special tool.
Figure 4:
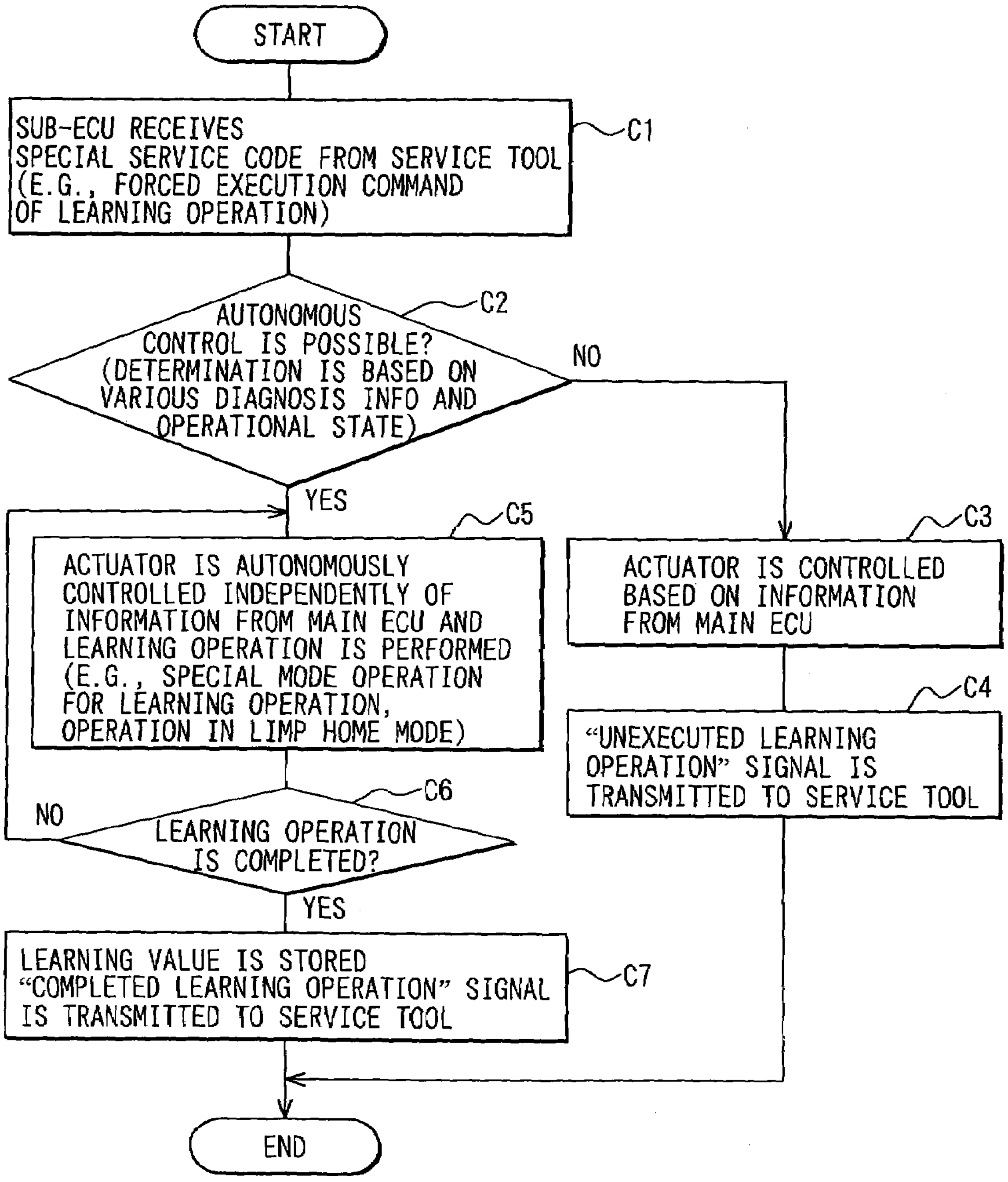
FIG. 4 is a flow chart for performing the learning control by giving the signal to an injection control ECU from the special tool.
Figure 5:
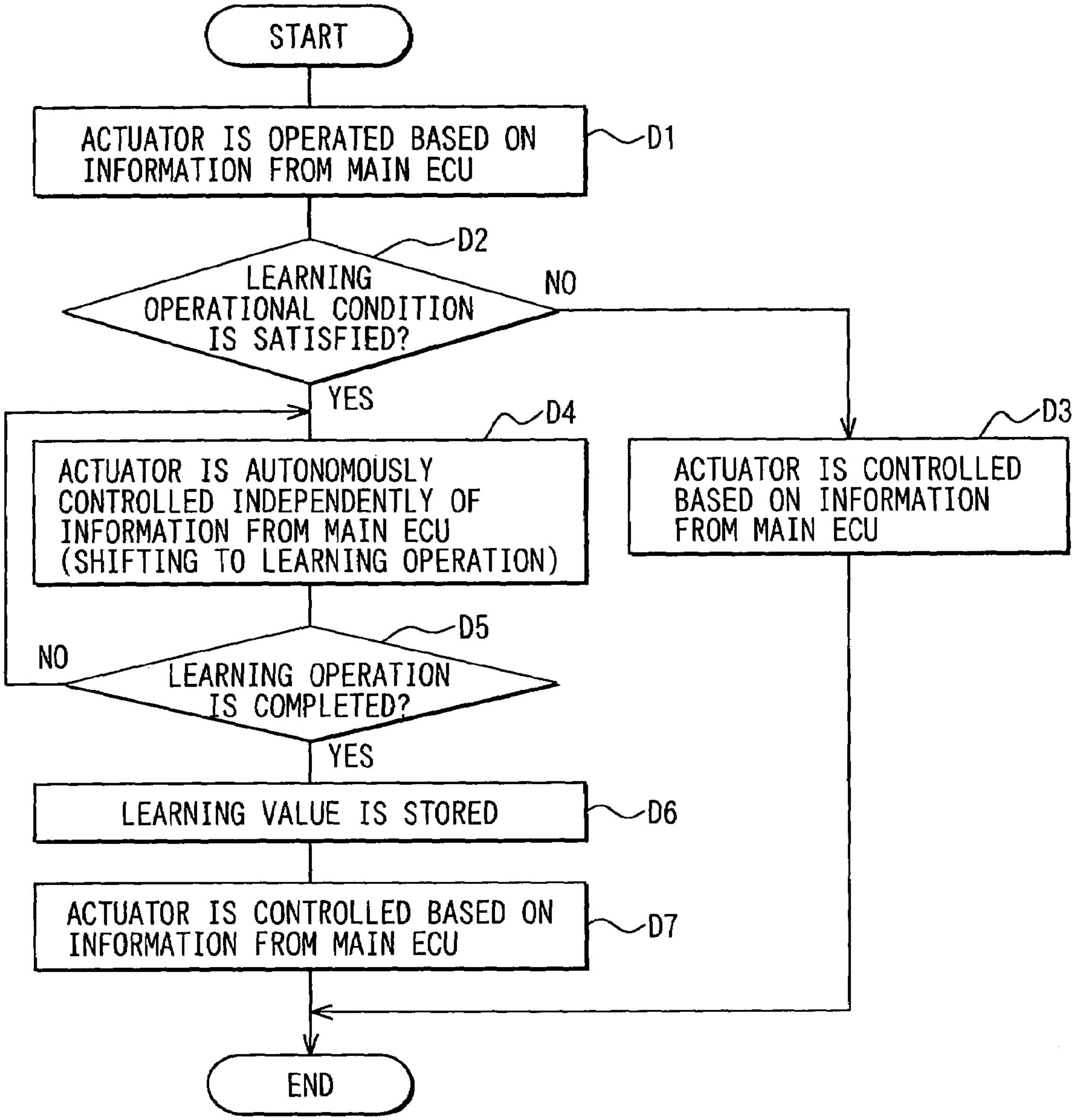
FIG. 5 is a flow chart for performing the learning control during an engine operation.

An example of the above-described diagnosis fail-safe control function will be described with reference to the FIG. 2. When the control routine is started (START), the self diagnosis means, which is installed in the main ECU 91, transmits a "normal state flag" indicating that the main ECU 91 is operated under the normal state, to the injection control ECU 92 (step A1).

Then, at the injection control ECU 92, it is determined if the "normal state flag" is properly transmitted from the main ECU 91 (step A2).

If the determination is YES at the step A2 (the main ECU 91 is operated under the normal state), the control for the normal state is performed. In other words, the functional components of the common rail fuel injection apparatus 1 are controlled based on the operational command values (the target injection quantity, the target injection timing and the target rail pressure), which are given by the main ECU 91 (step A3). Specifically, the operational command values, which are given by the main ECU 91, are corrected through the above described control function for the general operational state, and each actuator of the common rail fuel injection apparatus 1 is controlled, and then the control routine is finished (END).

If the determination is NO at the step A2 (the main ECU 91 has the failure), the injection control ECU 92 autonomously controls the common rail fuel injection apparatus 1. In other words, the injection control ECU 92 neglects the operational command values from the main ECU 91. Instead, the injection control ECU 92 autonomously controls the functional components of the common rail fuel injection apparatus 1 based on the various sensor signals (the present operational states), which are inputted to the injection control ECU 92 (step A4). Then, the control routine is finished (END).

The control function for the special mode will be described. When an external learning command is given, or the operational state of the engine 11 is a predetermined learning operational state, the injection control ECU 92 performs the learning function, where the injection control ECU 92 autonomously controls the common rail fuel injection apparatus 1 independently of the main ECU 91. Then, the injection control ECU 92 determines the correction value, which is used to correct an order value that is given to an actuator associated with an injection operation, to improve the degree of accuracy of an operation of the actuator.

The control function for the special mode is divided into an (A) learning function, which is performed when the external learning command is given, and a (B) learning function, which is performed when the operational state of the engine 11 is a predetermined learning operational state. In the (A) learning function, a special tool (e.g., a service tool for check and maintenance) is used at a manufactory, a dealer and a service shop. The special tool gives a special signal (e.g., a check and maintenance signal) to the main ECU 91 or the injection control ECU 92. This is one of examples, where the external learning command is given. Then, the injection control ECU 92 neglects the operational command values from the main ECU 91, and autonomously controls the common rail fuel injection apparatus 1 independently of the main ECU 91 to perform the learning operation of the actuator, the injection operation of which is controlled by the injection control ECU 92.

The autonomous control by the injection control ECU 92 in the (A) learning function varies according to learning operation details, which are given by the special signals. Through the autonomous control, the injection control ECU 92 sets up the engine operational state, which suits the learning operation.

During the general operational state, the (B) learning function is performed, when the operational state of the engine becomes the predetermined learning operational state, such as warming up of the engine 11 is finished as well as the idling is operated during the vehicle is stopped. This is one example of the predetermined learning operational state of the engine and the like. Then, the injection control ECU 92 neglects the operational command values from the main ECU 91, and autonomously controls the common rail fuel injection apparatus 1 independently of the main ECU 91 to perform the learning operation for the actuator, which is controlled by the injection control ECU 92.

When the injection control ECU 92 autonomously controls the common rail fuel injection apparatus 1 to perform the learning operation, it is desirable to transmit information, which indicates that the learning operation is executed, to the main ECU 91.

The (B) learning function is designed to interrupt or stop the learning operation where the injection control ECU 92 autonomously controls the common rail fuel injection apparatus 1, if the operational state becomes unsuitable for the learning operation, such as the occupant depresses the gas pedal fully, during the learning operation where the injection control ECU 92 autonomously controls the common rail fuel injection apparatus 1. Specifically, when the operational state becomes unsuitable for the learning operation, the main ECU 91 is designed to output a learning stop signal to the injection control ECU 92. When the injection control ECU 92 receives the learning stop signal, the injection control ECU 92 stops the autonomous control of the common rail fuel injection apparatus 1, and immediately controls the common rail fuel injection apparatus 1 based on the operational command value, which the main ECU 91 commands.

In the (B) learning function, the autonomous control by the injection control ECU 92 sets up a special engine operational state, which suits the learning operation. The common rail fuel injection apparatus 1 is autonomously controlled within a rage, where the autonomous control does not influence an operational state of the vehicle.

Specifically, during the learning operation, the injection control ECU 92 performs controls, such as idle speed control (ISC), FCCB control (uneven injection quantity compensation control) and the like, to set up the engine operational state, which suits the learning operation.

A control example of a forced learning control by giving a signal to the main ECU 91 from the special tool will be described. The forced learning control example, which is one of the control examples of the (A) learning function, will be described with reference to FIG. 3. In this example, the special tool (the service tool) gives the special signal (a service code) to the main ECU 91 to forcibly perform the learning control.

The main ECU 91 is designed to transmit the "service code", which is given by the service tool, for the learning operation to the injection control ECU 92. Also, the main ECU 91 is designed to transmit a learning operation execution signal, which the injection control ECU 92 generates, to the service tool.

When the control routine is started (START) and the main ECU 91 receives a "specific service code (e.g., a command code for a forced execution of a predetermined learning operation)", which is transmitted by the service tool (step B1), the main ECU 91 gives a "learning control execution by the injection control ECU 92" command (operational delegation command) to the injection control ECU 92 (step B2).

The injection control ECU 92 determines whether the operational state, which is indicated by various diagnosis information sets and the operational state of the engine 11, is suitable for the learning operation (step B3).

If the determination at the step B3 is NO (the operational state is not suitable for the autonomous learning), the injection control ECU 92 transmits a signal indicating that the autonomous control for the learning operation cannot be executed to the main ECU 91 (step B4). When the main ECU 91 receives the signal indicating that the autonomous control for the learning operation cannot be executed from the injection control ECU 92, the main ECU 91 transmits a signal indicating an "unexecuted learning operation" to the service tool. Therefore, the "unexecuted learning operation" can be confirmed through the service tool.

Then, the injection control ECU 92 controls the functional components of the common rail fuel injection apparatus 1 based on the operational command values (the target injection quantity, the target injection timing and the target rail pressure), which are given by the main ECU 91 (step B5). Specifically, the injection control ECU 92 corrects the operational command values, which are given by the main ECU 91, based on the control function for the general operational state, and the injection control ECU 92 controls each actuator of the common rail fuel injection apparatus 1. Then, the control routine is finished (END).

If the determination at the step B3 is YES (the operational state is suitable for the autonomous learning), the injection control ECU 92 neglects the operational command values, which are given by the main ECU 91, and autonomously controls the common rail fuel injection apparatus 1 so that the operational state becomes suitable for the learning operation (step B6). The operational states, which are suitable for the learning operation, include the operational state for the special mode for the learning operation and the operation in a limp home mode.

Then, the injection control ECU 92 determines whether the commanded learning operation is finished (step B7).

If the determination at the step B7 is NO (uncompleted learning operation), the injection control ECU 92 continues the autonomous control at the step B6.

If the determination at the step B7 is YES (completed learning operation), the following three processes are performed (step B8).

(i) the determined leaning value is stored in the storage device of the injection control ECU 92 (the memorizing function for memorizing the learning value).

(ii) the injection control ECU 92 transmits a signal indicating the completed learning operation to the service tool through the main ECU 91.

(iii) the injection control ECU 92 stops the autonomous control and returns to the general operation, where the injection control ECU 92 controls the functional components of the common rail fuel injection apparatus 1 based on the operational command values, which is given by the main ECU 91. Then, the control routine is finished (END).

A control example of the forced learning control by giving a signal to the injection control ECU 92 from the special tool will be described. The forced learning control example, which is one of the control examples of the (A) learning function, will be described with reference to a FIG. 4. In this example, the special tool (the service tool) directly gives the special signal (the service code) to the injection control ECU 92 to forcibly perform the learning control.

When the control routine is started (START) and the injection control ECU 92 receives the "specific service code (e.g., the command code for the forced execution of a predetermined learning operation)", which is transmitted by the service tool (step C1), the injection control ECU 92 determines whether the operational state, which is indicated by the various diagnosis information sets and the operational state of the engine, is suitable for the learning operation (step C2).

If the determination at the step C2 is NO (the operational state is suitable for the autonomous control), the injection control ECU 92 controls the functional components of the common rail fuel injection apparatus 1 based on the operational command values (the target injection quantity, the target injection timing and the target rail pressure), which are given by the main ECU 91 (step C3). Specifically, the injection control ECU 92 corrects the operational command values, which are given by the main ECU 91, based on the above-described control function for the general operational state, and the injection control ECU 92 controls each actuator of the common rail fuel injection apparatus 1.

Then, the injection control ECU 92 transmits the signal indicating the "unexecuted learning operation" to the service tool (step C4), and the control routine is finished (END). Therefore, the "unexecuted learning operation" can be confirmed through the service tool.

If the determination at the step C2 is YES (the operational state is suitable for the autonomous control), the injection control ECU 92 neglects the operational command values, which are given by the main ECU 91, and autonomously controls the common rail fuel injection apparatus 1 so that the operational state becomes suitable for the learning operation (step C5). The operational states, which are suitable for the learning operation, include the operational state for the special mode for the learning operation and the operation in the limp home mode.

Then, the injection control ECU 92 determines whether a commanded learning operation is finished (step C6).

If the determination at the step C6 is NO (uncompleted learning operation), the injection control ECU 92 continues the autonomous control at the step C5.

If the determination at the step C6 is YES (completed learning operation), the following three processes are performed (step C7).

(i) the determined leaning value is stored in the storage device of the injection control ECU 92 (the memorizing function for memorizing the learning value).

(ii) the injection control ECU 92 transmits a signal indicating the completed learning operation to the service tool through the main ECU 91.

(iii) the injection control ECU 92 stops the autonomous control and returns to the general operation, where the injection control ECU 92 controls the functional components of the common rail fuel injection apparatus 1 based on the operational command values, which is given by the main ECU 91. Then, the control routine is finished (END).

An control example of learning control during the engine operation will be described. The above-described (B) learning function will be described with reference to FIG. 5.

The control routine is started (START) and the injection control ECU 92 controls the functional components of the common rail fuel injection apparatus 1 based on the operational command values (the target injection quantity, the target injection timing and the target rail pressure), which are given by the main ECU 91 (step D1). During this general operation (step D1), the injection control ECU 92 determines whether the operational state of the engine 11 is suitable for the learning operation (step D2). The operational states, which are suitable for the learning operation, include a situation, where a mileage of the vehicle reaches a predetermined distance as well as the engine 11 is stably idling.

If the determination at the step D2 is NO (the operational state is not suitable for the learning operation), the injection control ECU 92 controls the functional components of the common rail fuel injection apparatus 1 based on the operational command values (the target injection quantity, the target injection timing and the target rail pressure), which are given by the main ECU 91 (step D3). Specifically, the injection control ECU 92 corrects the operational command values, which are given by the main ECU 91, based on the above-described control function for the general operational state, and the injection control ECU 92 controls each actuator of the common rail fuel injection apparatus 1. Then, the control routine is finished (END).

If the determination at the step D2 is YES (the operational state is suitable for the learning operation), the injection control ECU 92 neglects the operational command values, which are given by the main ECU 91, and autonomously controls the common rail fuel injection apparatus 1 so that the operational state becomes suitable for the learning operation (step D4). The operational states, which are suitable for the learning operation, include the operation mode for the learning operation. This autonomous control does not influence the operational state of the vehicle, and includes ISC and FCCB control.

Then, the injection control ECU 92 determines whether the commanded learning operation is finished (step D5).

If the determination at the step D5 is NO (uncompleted learning operation), the injection control ECU 92 continues the autonomous control at the step D4.

If the determination at the step D5 is YES (completed learning operation), the calculated leaning value is stored in the storage device of the injection control ECU 92 (the memorizing function for memorizing the learning value) (step D6). Then, the autonomous control for the learning operation by the injection control ECU 92 is finished. The injection control ECU 92 returns to the general operation, where the injection control ECU 92 controls the functional components of the common rail fuel injection apparatus 1 based on the operational command values, which is given by the main ECU. 91 (step D7). Then, the control routine is finished (END).

The function for giving the operational command values to the supercharger 2 and the EGR apparatus 3 will be described. The injection control ECU 92 includes the function to calculate the operational command values for the supercharger 2 and the EGR apparatus 3 in place of the main ECU 91, and to give the calculated operational command value to the boost control ECU 93 and the EGR control ECU 94, while the injection control ECU 92 autonomously controls the common rail fuel injection apparatus 1 independently of the main ECU 91.

Specifically, when the injection control ECU 92 performs the learning control of the common rail fuel injection apparatus 1, the engine 11 may be kept under a special state.

In this case, the injection control ECU 92, which performs the learning control, commands the super boost control ECU 93 so that the supercharger 2 is operated under a "specific operational state, which is suitable for the learning operation of the common rail fuel injection apparatus 1". Also, the injection control ECU 92 commands the EGR control ECU 94 so that the EGR apparatus 3 is operated under a "specific operational state, which is suitable for the learning operation of the common rail fuel injection apparatus 1".

Command (signal) communication between the sub-ECUs is performed through a control area network (CAN), which is already commonly installed in the vehicle, and the like.

Therefore, the main ECU 91 is not required to calculate the dedicated "operational command values for the supercharger 2 and the EGR apparatus 3". The dedicated operational command values are dedicated for the operation, where the injection control ECU 92 performs the learning control.

Effects of controlling the common rail fuel injection apparatus 1 through the injection control ECU 92 will be described.

In the present embodiment, the ECU of the engine control system is divided and includes the main ECU 91 and the injection control ECU 92. The main ECU 91 calculates the operational command values for the common rail fuel injection apparatus 1 according to the operational state of the engine 11. The injection control ECU 92 directly controls the common rail fuel injection apparatus 1 based on the operational command values, which are calculated by the main ECU 91.

The first effect will be described. The injection control ECU 92 includes the independent computer, which is different from that of the main ECU 91.

The injection control ECU 92 corrects the operational command values, which are calculated by the main ECU 91, based on the operational state of the engine 11 or the correction values stored in the storage device. Then, the injection control ECU 92 directly controls the operation of the common rail fuel injection apparatus 1.

Therefore, in a case where the common rail fuel injection apparatus 1 is changed to a different-version apparatus, only the common rail fuel injection apparatus 1 and the injection control ECU 92 need to be replaced with new corresponding ones. The other ECUs, such as the main ECU 91, are not influenced. In other words, the other ECUs can be used without being changed.

Thus, in a case where the common rail fuel injection apparatus 1 is changed, only the new injection control ECU needs to be developed. This minimizes manpower for development in the change of the common rail fuel injection apparatus 1.

The second effect will be described. The injection control ECU 92 autonomously controls the common rail fuel injection apparatus 1 independently of the main ECU 91, when a predetermined external operational command is directed (e.g., a case where an external learning command is given during a check operation), an operational delegation command is directed by the main ECU 91 (e.g., a case where the main ECU 91 has a failure and the main ECU gives a command for a withdrawal drive), or the engine 11 is operated under a predetermined operational state (e.g., the operational state becomes suitable for the learning operation, while the vehicle is driven).

In other words, the injection control ECU 92 controls the common rail fuel injection apparatus 1 without depending on the main ECU 91.

Thus, the direct relationship between the main ECU 91 and the common rail fuel injection apparatus 1 is limited. Therefore, there remains the effect of the separation of the injection control ECU 92.

The third effect will be described. The injection control ECU 92 autonomously controls the common rail fuel injection apparatus 1 independently of the main ECU 91, when the predetermined external operation command is directed (e.g., a case where the external learning command is given during the check operation), the operational delegation command is directed by the main ECU 91 (e.g., a case where the main ECU 91 has the failure and the main ECU gives the command for the withdrawal drive), or the engine 11 is operated under the predetermined operational state (e.g., the operational state becomes suitable for the learning operation, while the vehicle is driven).

Specifically, the injection control ECU 92 autonomously controls the common rail fuel injection apparatus 1 independently of the main ECU 91, when the operational state becomes suitable for the learning operation, while the engine 11 is operated.

As a result, during the learning operation of the common rail fuel injection apparatus 1, the injection control ECU 92 sets up the special engine operational state, which is suitable for the learning operation. Thus, the operation of the common rail fuel injection apparatus 1 during an "interval between a start and an end of the learning operation" depends on the injection control ECU 92.

An opportunity to perform the learning operation while driving the vehicle is usually not often and also limited to a short time. Thus, the learning operation is often not finished.

In the present embodiment, the injection control ECU 92 performs the autonomous control, when the operational state becomes suitable for the learning operation. Thus, a control logic interrupt latency at the main ECU 91 does not occur, when the learning operation needs to be started. Therefore, the learning operation can be started sooner.

Therefore, the possibility of finishing the learning operation is increased.

Control of the supercharger 2 will be described. As described above, the super charger 2 is controlled by the main ECU 91 and the boost control ECU 93.

A function of the main ECU 91 for controlling the supercharger 2 will be described. The main ECU 91 calculates an operational command value (a target supercharge value), which is a fundamental value for a boost control, to control the supercharger 2. Then, the main ECU 91 outputs the operational command value to the boost control ECU 93.

A function of the boost control ECU 93 will be described. The boost control ECU 93 directly controls all actuators, which are installed on the supercharger 2 (in the present embodiment, only the turbo actuator 23 is controlled). The boost control ECU 93 has an independent computer, which is independent of the other ECUs (the main ECU 91, the injection control ECU 92 and the EGR control ECU 94). The boost control ECU 93 includes the CPU, the storage device, the input circuit, the output circuit and the power circuit. The CPU performs the control process and the calculating process. The storage device stores various programs and data. The power circuit may be commonly used with the other ECUs. The boost control ECU 93 at least includes the computer, which performs calculation independently of the other ECUs.

The boost control ECU 93 corrects the operational command value (the target supercharge value), which is inputted by the main ECU 91.

The boost control ECU 93 autonomously controls the supercharger 2 independently of the main ECU 91 in the special mode.

An effect of using the boost control ECU 93 will be described. In the present embodiment, the supercharger 2 is controlled by the main ECU 91 and the boost control ECU 93. Each of the ECUs 91, 93 includes the corresponding independent computer.

Therefore, in a case where the supercharger 2 is changed to a different-version supercharger, only the supercharger 2 and the boost control ECU 93 need to be replaced with new corresponding ones. The other ECUs, such as the main ECU 91, are not influenced. In other words, the other ECUs can be used without being changed.

Thus, in a case where the supercharger 2 is changed, only the new boost control ECU needs to be developed. This minimizes the manpower for development in the change of the supercharger 2.

Control of the EGR apparatus 3 will be described. The EGR apparatus 3 is controlled by the main ECU 91 and the EGR control ECU 94.

A function of the main ECU 91 for controlling the EGR apparatus 3 will be described. The main ECU 91 calculates an operational command value (a target EGR ratio), which is a fundamental value for an EGR control, to control the EGR apparatus 3. Then, the main ECU 91 outputs the operational command value to the EGR control ECU 94.

A function of the EGR control ECU 94 will be described. The EGR control ECU 94 directly controls all actuators, which are installed on the EGR apparatus 3 (in the present embodiment, only the EGR valve 32 is controlled). The EGR control ECU 94 includes an independent computer, which is independent of the other ECUs (the main ECU 91, the injection control ECU 92 and the boost control ECU 93). The EGR control ECU 94 includes the CPU, the storage device, the input circuit, the output circuit and the power circuit. The CPU performs the control process and the calculating process. The storage device stores various programs and data. The power circuit may be commonly used with the other ECUs. The EGR control ECU 94 at least includes the computer, which performs calculation independently of the other ECUs.

The EGR control ECU 94 corrects the operational command value (the target EGR ratio), which is inputted by the main ECU 91.

The EGR control ECU 94 autonomously controls the EGR apparatus 3 independently of the main ECU 91 in the special mode.

An effect of using the EGR control ECU 94 will be described. In the present embodiment, the EGR apparatus 3 is controlled by the main ECU 91 and the EGR control ECU 94. Each of the ECUs 91, 94 includes the corresponding independent computer.

Therefore, in a case where the EGR apparatus 3 is changed to a different-version apparatus, only the EGR apparatus 3 and the EGR control ECU 94 need to be replaced with new corresponding ones. The other ECUs, such as the main ECU 91, are not influenced. In other words, the other ECUs can be used without being changed.

Thus, in a case where the EGR apparatus 3 is changed, only the new EGR control ECU needs to be developed. This minimizes the manpower for development in the change of the EGR apparatus 3.

A modification of the present embodiment will be described. In the above-described embodiment, the common rail fuel injection apparatus 1, which has a two-way injector 13, is disclosed. An injection state of the two-way injector 13 is controlled by an operation of the solenoid valve 15. However, the common rail fuel injection apparatus 1 may includes other injector, such as a direct drive injector, which includes an actuator (e.g., a piezo actuator) that directly drives a needle, and a three-way injector.

In the above-described embodiment, the common rail fuel injection apparatus 1, which serves as an example of the fuel injection apparatus, is disclosed. However, the present invention may be applied to an engine control system, which has other fuel injection apparatus, such as a gasoline engine fuel injection apparatus and a diesel engine fuel injection apparatus that does not include the common rail accumulator 12.

Additional advantages and modifications will readily occur to those skilled in the art. The invention in its broader terms is therefore not limited to the specific details, representative apparatus, and illustrative examples shown and described.

What is claimed is:

1. A control system for controlling a control target apparatus provided to an engine, the control system comprising:
- a main ECU for calculating at least one operational command value according to an operational state of the engine, wherein the at least one operational command value is used to operate the control target apparatus; and
- a sub-ECU, which is independent of the main ECU, wherein:
  - the sub-ECU controls the control target apparatus non-autonomously and autonomously;
  - in non-autonomous control of the control target apparatus, the sub-ECU corrects the at least one operational command value, which is calculated by the main ECU, based on at least one of the followings:
    - the operational state of the engine; and
    - a correction value, which is stored in a storage of the sub-ECU to correct the at least one operational command value;
  - the sub-ECU non-autonomously controls the control target apparatus by use of the corrected at least one operational command value corrected by the sub-ECU; and
  - in autonomous control of the control target apparatus, the sub-ECU autonomously controls the control target apparatus independently of the main ECU, when at least one of the following conditions is satisfied:
    - a predetermined external operational command, which commands the sub-ECU to autonomously control the control target apparatus independently of the main ECU, is given to the sub-ECU;
    - an operational delegation command, which allows the sub-ECU to autonomously control the control target apparatus independently of the main ECU, is given to the sub-ECU by the main ECU; and
    - the engine is operated under a predetermined operational state.

2. The control system according to claim 1, wherein:
- the control target apparatus includes at least one actuator, which is controlled by the sub-ECU; and
- the sub-ECU performs a learning operation, in which the sub-ECU performs the autonomous control of the control target apparatus to improve a degree of accuracy of:
  - an order value, which is given to the at least one actuator; and
  - an operational amount of the at least one actuator, when at least one of the following conditions is satisfied:
    - an external learning command, which commands the sub-ECU to perform the learning operation, is given to the sub-ECU; and
    - the engine is operated under a predetermined leaning operational state.

3. The control system according to claim 1, wherein:
- the control target apparatus is a fuel injection apparatus for injecting a fuel to the engine; and
- the sub-ECU is an injection control ECU for controlling at least one actuator, which is installed in the fuel injection apparatus.

4. The control system according to claim 3, wherein:
- the fuel injection apparatus includes:
  - a high-pressure pump for pumping a high-pressure fuel;
  - a common rail accumulator for storing the high-pressure fuel, which is pumped by the high-pressure pump; and
  - an injector for injecting the high-pressure fuel, which is stored in the common rail accumulator;
- the at least one operational command value, which is calculated by the main ECU, is a plurality of the operational command values;
- the plurality of the operational command values is a target rail pressure, a target injection timing and a target injection quantity;

in the non-autonomous control of the fuel injection apparatus, the injection control ECU corrects the plurality of the operational command values based on at least one of the followings:

the operational state of the engine; and the correction value, which is stored in the storage of the injection control ECU to correct the plurality of the operational command values;

the injection control ECU non-autonomously controls the followings by use of the plurality of the corrected operational command values corrected by the injection control ECU:

an amount of pumped fuel, which is pumped by the high-pressure pump;

an injection starting timing of the injector; and an injection period of the injector; and in the autonomous control of the fuel injection apparatus, the injection control ECU autonomously controls the followings independently of the main ECU:

the amount of pumped fuel, which is pumped by the high-pressure pump;

the injection starting timing of the injector; and the injection period of the injector.

5. The control system according to claim 1, wherein:

the control target apparatus is a supercharger for supercharging the engine; and the sub-ECU is a boost control ECU for controlling at least one actuator, which is installed in the supercharger.

6. The control system according to claim 1, wherein:

the control target apparatus is an EGR apparatus for returning a part of an exhaust gas of the engine to an intake side of the engine; and the sub-ECU is an EGR control ECU for controlling at least one actuator, which is installed in the EGR apparatus.

7. The control system according to claim 1, wherein:

the control target apparatus is a first control target apparatus;

the engine is further provided with a second control target apparatus; and the sub-ECU is a first sub-ECU, which controls the first control target apparatus, the control system further comprising another sub-ECU, wherein the another sub-ECU is a second sub-ECU, which controls the second control target apparatus, wherein:

in the autonomous control of the first control target apparatus, the first sub-ECU autonomously controls the first control target apparatus independently of the main ECU; and the first sub-ECU in place of the main ECU calculates at least one operational command value, which the second sub-ECU uses to operate the second control target apparatus.

* * * * *